United States Patent
Okada

(10) Patent No.: US 11,009,676 B2
(45) Date of Patent: May 18, 2021

(54) IMAGING LENS AND IMAGING APPARATUS

(71) Applicant: FUJIFILM Corporation, Tokyo (JP)

(72) Inventor: Kazuyoshi Okada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 16/566,626

(22) Filed: Sep. 10, 2019

(65) Prior Publication Data

US 2020/0003991 A1 Jan. 2, 2020

Related U.S. Application Data

(63) Continuation of application No. PCT/JP2018/008425, filed on Mar. 5, 2018.

(30) Foreign Application Priority Data

Mar. 15, 2017 (JP) .............................. JP2017-049840

(51) Int. Cl.
*G02B 9/00* (2006.01)
*G02B 9/10* (2006.01)
(Continued)

(52) U.S. Cl.
CPC ............... *G02B 9/10* (2013.01); *G02B 13/02* (2013.01); *G02B 13/18* (2013.01)

(58) Field of Classification Search
CPC .......... G02B 13/18; G02B 9/64; G02B 13/24; G02B 9/60; G02B 9/62; G02B 9/04;
(Continued)

(56) References Cited

U.S. PATENT DOCUMENTS

2010/0284092 A1 11/2010 Hayakawa
2011/0211263 A1 9/2011 Sato et al.
(Continued)

FOREIGN PATENT DOCUMENTS

| CN | 101842730 A | 9/2010 |
|---|---|---|
| CN | 103797397 A | 5/2014 |

(Continued)

OTHER PUBLICATIONS

An Office Action; "Notice of Reasons for Refusal," mailed by the Japanese Patent Office dated Aug. 20, 2019, which corresponds to Japanese Patent Application No. 2017-049840 and is related to U.S. Appl. No. 16/566,626; with English language translation.
(Continued)

*Primary Examiner* — Marin Pichler
*Assistant Examiner* — Henry A Duong
(74) *Attorney, Agent, or Firm* — Studebaker & Brackett PC

(57) ABSTRACT

The imaging lens consists of, in order from the object side, a positive first lens group that moves to the object side during focusing from a long distance to a short distance, and a second lens group that does not move during focusing. The first lens group has a first-B sub-lens group. The first-B sub-lens group consists of, in order from the object side, a positive b1 lens, a negative b2 lens concave toward the image side, an aperture stop, a negative b3 lens concave toward the object side, and a positive b4 lens. The second lens group consists of, in order from the object side, a negative lens, a positive lens, and a negative lens. Predetermined conditional expressions are satisfied.

20 Claims, 10 Drawing Sheets

EXAMPLE 1

(51) Int. Cl.
*G02B 13/02* (2006.01)
*G02B 13/18* (2006.01)

(58) Field of Classification Search
CPC ... G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 13/02; G02B 13/04; G02B 13/003; G02B 13/0035; G02B 13/004; G02B 13/0045; G02B 13/005; G02B 13/0055; G02B 15/142–1425; G02B 7/02; G03B 30/00
USPC ........ 359/682, 691–692, 748, 753, 793–795, 359/702–704, 826–830
See application file for complete search history.

(56) References Cited

U.S. PATENT DOCUMENTS

| | | | |
|---|---|---|---|
| 2013/0135514 A1 | 5/2013 | Maetaki | |
| 2013/0141629 A1 | 6/2013 | Yoshinaga et al. | |
| 2013/0222925 A1* | 8/2013 | Onozaki | G02B 27/646 359/692 |
| 2013/0265648 A1 | 10/2013 | Saori | |
| 2014/0198394 A1 | 7/2014 | Komatsu et al. | |
| 2014/0211329 A1 | 7/2014 | Chen | |
| 2014/0347749 A1 | 11/2014 | Ono | |
| 2015/0130985 A1 | 5/2015 | Kawamura et al. | |
| 2016/0274335 A1 | 9/2016 | Kawamura | |
| 2016/0341938 A1 | 11/2016 | Sun | |
| 2017/0307858 A1* | 10/2017 | Chen | G02B 13/006 |
| 2018/0196223 A1* | 7/2018 | Umeda | G02B 27/0025 |

FOREIGN PATENT DOCUMENTS

| | | |
|---|---|---|
| CN | 103823292 A | 5/2014 |
| CN | 104094152 A | 10/2014 |
| CN | 104635319 A | 5/2015 |
| CN | 105988204 A | 10/2016 |
| CN | 106168706 A | 11/2016 |
| EP | 1 837 693 A1 | 9/2007 |
| JP | 2012-155223 A | 8/2012 |
| JP | 2013-130724 A | 7/2013 |
| JP | 2013-178365 A | 9/2013 |
| JP | 2013-210604 A | 10/2013 |
| JP | 2013-231941 A | 11/2013 |
| JP | 2014-126652 A | 7/2014 |
| NO | 2012-026069 A1 | 3/2012 |

OTHER PUBLICATIONS

International Search Report issued in PCT/JP2018/008425; dated May 22, 2018.

Written Opinion issued in PCT/JP2018/008425; dated May 22, 2018.

An Office Action mailed by China National Intellectual Property Administration dated Dec. 30, 2020, which corresponds to Chinese Patent Application No. 201880017021.0 and is related to U.S. Appl. No. 16/566,626 with English language translation.

* cited by examiner

EXAMPLE 1

EXAMPLE 2

EXAMPLE 3

EXAMPLE 4

EXAMPLE 5

EXAMPLE 6

EXAMPLE 2

EXAMPLE 5

EXAMPLE 6

IMAGING LENS AND IMAGING APPARATUS

CROSS REFERENCE TO RELATED APPLICATIONS

The present application is a Continuation of PCT International Application No. PCT/JP2018/008425 filed on Mar. 5, 2018, which claims priority under 35 U.S.C. § 119(a) to Japanese Patent Application No. 2017-049840 filed on Mar. 15, 2017. Each of the above applications is hereby expressly incorporated by reference in its entirety, into the present application.

BACKGROUND OF THE INVENTION

1. Field of the Invention

The present invention relates to an imaging lens and an imaging apparatus. In particular, the present invention relates to an imaging lens, which is suitable for a factory automation (FA) camera, a machine vision (MV) camera, a digital camera, a surveillance camera, an on-board camera, and the like, and an imaging apparatus comprising the imaging lens.

2. Description of the Related Art

Examples of the imaging lens having a focusing function conventionally known include imaging lenses described in JP2013-178365A, JP2013-210604A, and JP2013-231941A. JP2013-178365A, JP2013-210604A, and JP2013-231941A each describe a lens system that consists of a first lens group having a positive refractive power and a second lens group having a positive or negative refractive power in order from the object side and that performs focusing by moving at least the first lens group.

SUMMARY OF THE INVENTION

There is a demand for the MV camera to capture images of various shaped objects at various object distances, and there is a recent demand for the MV camera to be compatible with an imaging element in which the number of pixels is increased. Therefore, it is desirable that the imaging lens has high optical performance by satisfactorily correcting aberrations in the entire imaging range, in particular, has small fluctuation in astigmatism during focusing and has small field curvature.

However, the lens systems described in JP2013-178365A and JP2013-210604A each have a disadvantage that field curvature is large. The lens system described in JP2013-231941A has a disadvantage that fluctuation in astigmatism during focusing is large.

The present invention has been made in consideration of the above-mentioned situations, and it is possible to provide an imaging lens, which has a small field curvature and has favorable optical performance by suppressing fluctuation in astigmatism during focusing, and an imaging apparatus comprising the imaging lens.

An imaging lens of the present invention consists of, in order from an object side: a first lens group that moves toward the object side during focusing from a distant object to a close-range object and has a positive refractive power; and a second lens group that remains stationary with respect to an image plane during focusing. The first lens group has a first-B sub-lens group including an aperture stop in an inside thereof. The first-B sub-lens group consists of, in order from the object side, a b1 lens which is a positive lens, a b2 lens which is a negative lens concave toward an image side, an aperture stop, a b3 lens which is a negative lens concave toward the object side, and a b4 lens which is a positive lens. The second lens group consists of, in order from the object side, a negative lens, a positive lens, and a negative lens. In addition, assuming that a distance on an optical axis from an object side surface of the b1 lens to an image side surface of the b2 lens is Db12, a distance on the optical axis from a surface closest to the object side in the first lens group to a surface closest to the image side in the first lens group is DG1, a maximum image height is Ymax, a total number of lens surfaces of the second lens group is k, a refractive index of a medium, which forms an i-th lens surface from the object side in the second lens group, on the object side at a d line is Nif, a refractive index of the medium, which forms the i-th lens surface from the object side in the second lens group, on the image side at the d line is Nir, and a radius of curvature of the i-th lens surface from the object side in the second lens group is sRi, Conditional Expressions (1) and (2) are satisfied.

$$0.1 < Db12/DG1 < 0.25 \tag{1}$$

$$-0.02 < Y\max \times \sum_{i=1}^{k}\left(\frac{1}{Nif} - \frac{1}{Nir}\right)/sRi < 0.08 \tag{2}$$

It is preferable that the imaging lens of the present invention satisfies Conditional Expression (1-1) and/or (2-1).

$$0.12 < Db12/DG1 < 0.22 \tag{1-1}$$

$$-0.01 < Y\max \times \sum_{i=1}^{k}\left(\frac{1}{Nif} - \frac{1}{Nir}\right)/sRi < 0.07 \tag{2-1}$$

In the imaging lens of the present invention, assuming that a radius of curvature of the image side surface of the b2 lens is Rb2r, and a radius of curvature of an object side surface of the b3 lens is Rb3f, it is preferable to satisfy Conditional Expression (3), and it is more preferable to satisfy Conditional Expression (3-1).

$$-0.3 < (Rb2r + Rb3f)/(Rb2r - Rb3f) < 0.3 \tag{3}$$

$$-0.2 < (Rb2r + Rb3f)/(Rb2r - Rb3f) < 0.1 \tag{3-1}$$

In the imaging lens of the present invention, assuming that a focal length of a whole system during focusing on an object at infinity is f, and a focal length of the second lens group is f2, it is preferable to satisfy Conditional Expression (4), and it is more preferable to satisfy Conditional Expression (4-1).

$$-0.7 < f/f2 < 0.3 \tag{4}$$

$$-0.6 < f/f2 < 0.2 \tag{4-1}$$

In the imaging lens of the present invention, assuming that a focal length of a whole system during focusing on an object at infinity is f, a focal length of a j-th lens from the object side in the second lens group is f2j, and an Abbe number of the j-th lens from the object side in the second lens group at the d line is v2j, it is preferable to satisfy Conditional Expression (5), and it is more preferable to satisfy Conditional Expression (5-1).

$$-0.05 < f \times \sum_{j=1}^{3} \frac{1}{f2j \times v2j} < -0.005 \quad (5)$$

$$-0.035 < f \times \sum_{j=1}^{3} \frac{1}{f2j \times v2j} < -0.01 \quad (5\text{-}1)$$

In the imaging lens of the present invention, assuming that a radius of curvature of an object side surface of the b3 lens is Rb3f, and a radius of curvature of an image side surface of the b3 lens is Rb3r, it is preferable to satisfy Conditional Expression (6), and it is more preferable to satisfy Conditional Expression (6-1).

$$-0.8 < (Rb3f + Rb3r)/(Rb3f - Rb3r) < 0 \quad (6)$$

$$-0.75 < (Rb3f + Rb3r)/(Rb3f - Rb3r) < -0.05 \quad (6\text{-}1)$$

In the imaging lens of the present invention, assuming that a radius of curvature of an object side surface of the b2 lens is Rb2f, and a radius of curvature of the image side surface of the b2 lens is Rb2r, it is preferable to satisfy Conditional Expression (7), and it is more preferable to satisfy Conditional Expression (7-1).

$$0.3 < (Rb2f + Rb2r)/(Rb2f - Rb2r) < 1.5 \quad (7)$$

$$0.35 < (Rb2f + Rb2r)/(Rb2f - Rb2r) < 1.2 \quad (7\text{-}1)$$

In the imaging lens of the present invention, it is preferable that the first lens group consists of, in order from the object side, a first-A sub-lens group having a positive refractive power, a first-B sub-lens group, and a first-C sub-lens group having a positive refractive power. In this case, it is preferable that the first-A sub-lens group consists of one or two lenses. Further, it is preferable that the first-C sub-lens group consists of one or two lenses.

In the imaging lens of the present invention, it is preferable that the b1 lens and the b2 lens are cemented with each other. Further, it is preferable that the b3 lens and the b4 lens are cemented with each other.

In the imaging lens of the present invention, it is preferable that the positive lens of the second lens group is a biconvex lens.

An imaging apparatus of the present invention comprises the imaging lens of the present invention.

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and/or a camera shaking correction mechanism.

In addition, the term "~ group that has a positive refractive power" in the present specification means that the group has a positive refractive power as a whole. It is the same for the term "~ group that has a negative refractive power". The "~ lens group" is not necessarily composed of a plurality of lenses, but may be composed of only one lens. The sign of the refractive power of the above defined lens group, the sign of the refractive power of the lens, the surface shape of the lens, and the radius of curvature are assumed as those in the paraxial region in a case where the aspheric surface is included therein. The "negative meniscus lens" is a meniscus lens that has a negative refractive power. All the conditional expressions are based on the d line (a wavelength of 587.6 nm (nanometers)) in a state where the object at infinity is in focus. In a case of calculating Conditional Expressions (2) and (2-1), the cemented surface is counted as one surface.

According to the present invention, the lens system consists of, in order from the object side, a positive first lens group that moves to the object side during focusing from the distant object to the close-range object, and a second lens group that does not move during focusing. In the lens system, by appropriately setting specific configurations of the first lens group and the second lens group, predetermined conditional expressions are satisfied. With such a configuration, it is possible to provide an imaging lens, which has a small field curvature and has favorable optical performance by suppressing fluctuation in astigmatism during focusing, and an imaging apparatus comprising the imaging lens.

DESCRIPTION OF THE PREFERRED EMBODIMENTS

Figure 1:
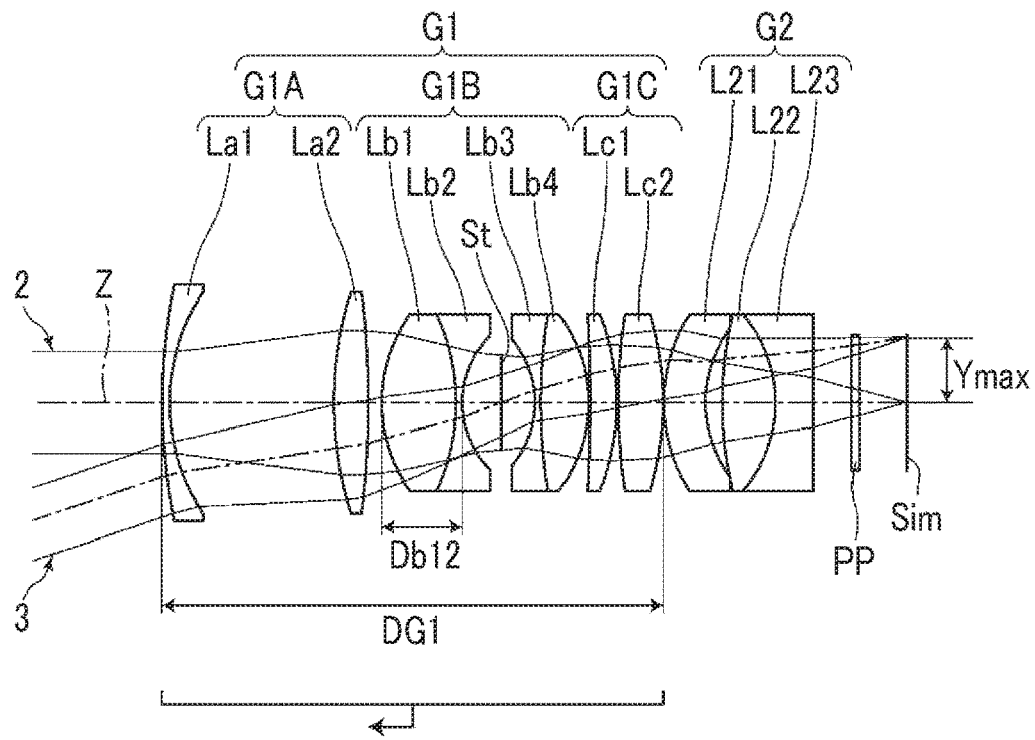
FIG. 1 is a cross-sectional view illustrating a configuration and an optical path of an imaging lens of Example 1 of the present invention.

Hereinafter, embodiments of the present invention will be described in detail with reference to the drawings. FIGS. 1 to 6 are cross-sectional views illustrating configurations and optical paths of imaging lenses according to an embodiment of the present invention, and respectively correspond to Examples 1 to 6 to be described later. Basic configurations and methods shown in the drawings of examples shown in FIGS. 1 to 6 are the same, and will be hereinafter described with reference to mainly the example shown in FIG. 1. FIG. 1 shows the state where the infinite distance object is in focus, and shows optical paths of on-axis rays 2 and off-axis rays with the maximum angle of view 3, where the left side is the object side thereof, and the right side thereof is the image side.

This imaging lens is a single focus lens, and consists of a first lens group G1 and a second lens group G2 in order from the object side to the image side along the optical axis Z. The first lens group G1 has an aperture stop St inside. It should be noted that the aperture stop St shown in FIG. 1 does not necessarily indicate its size and shape, and indicates a position of the stop on the optical axis Z.

In order to apply the imaging lens to an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The first lens group G1 is configured to have a positive refractive power, and is configured to move to the object side during focusing from a distant object to a close-range object. The second lens group G2 is configured to remain stationary with respect to the image plane Sim during focusing. With such a configuration, it is possible to suppress fluctuations in spherical aberration and astigmatism during focusing. In the example shown in FIG. 1, the entire first lens group G1 is configured to move integrally during focusing. Thereby, it is possible to simplify a driving mechanism thereof.

The first lens group G1 consists of a first-B sub-lens group G1B including an aperture stop St in the inside thereof. The first-B sub-lens group consists of, in order from the object side, a b1 lens Lb1 which is a positive lens, a b2 lens Lb2 which is a negative lens concave toward the image side, an aperture stop St, a b3 lens Lb3 which is a negative lens concave toward the object side, and b4 lens Lb4 which is a positive lens. As described above, coma aberration can be satisfactorily suppressed by providing the first-B sub-lens group G1B which is configured to be symmetric to the aperture stop St. The b1 lens Lb1 is preferably convex toward the object side, and the b4 lens Lb4 is preferably convex toward the image side. In such a case, coma aberration can be more satisfactorily suppressed.

It is preferable that the b1 lens Lb1 and the b2 lens Lb2 be cemented to each other. Thereby, there is an advantage in correcting longitudinal chromatic aberration. Similarly, it is preferable that the b3 lens Lb3 and the b4 lens Lb4 be cemented to each other. Thereby, there is an advantage in correcting longitudinal chromatic aberration.

The first lens group G1 may have s sub-lens group other than the first-B sub-lens group G1B. For example, the first lens group G1 may be configured to consist of, in order from the object side, a first-A sub-lens group G1A having a positive refractive power, a first-B sub-lens group G1B, and a first-C sub-lens group G1C having a positive refractive power. In such a case, coma aberration can be satisfactorily suppressed.

In a case where the first lens group G1 consists of the above three sub-lens groups, it is preferable that the first-A sub-lens group G1A is configured to consist of one or two lenses. In such a case, it becomes easy to achieve both suppression of the entire lens system length and favorable aberration correction. The first-A sub-lens group G1A in the example of FIGS. 1 and 3 consists of, in order from the object side, a negative lens and a positive lens. In a case where the negative lens is disposed to be closest to the object side in the whole system as described above, there is an advantage in achieving wide angle. In a case where the first-A sub-lens group G1A is configured to consist of one positive lens as in the examples of FIGS. 2 and 4, there is an advantage in achieving reduction in size. In a case where the first-A sub-lens group G1A is configured to consist of two positive lenses as in the examples of FIGS. 5 and 6, there is an advantage in correcting spherical aberration.

In a case where the first lens group G1 consists of the above three sub-lens groups, it is preferable that the first-C sub-lens group G1C be configured to consist of one or two lenses. In such a case, it becomes easy to achieve both suppression of the entire lens system length and favorable aberration correction. The first-C sub-lens group G1C in the example of FIGS. 1, 3, 5, and 6 consists of two positive lenses. The first-C sub-lens group G1C in the example of FIGS. 2 and 4 consists of one positive lens.

The second lens group G2 consists of, in order from the object side, a lens L21 which is a negative lens, a lens L22 which is a positive lens, and a lens L23 which is a negative lens. Thereby, it is possible to satisfactorily suppress fluctuation in astigmatism during focusing while achieving reduction in size with a relatively small number of lenses.

It is preferable that the positive lens in the second lens group G2 is a biconvex lens. In such a case, it becomes easy to balance spherical aberration and distortion.

Figure 2:
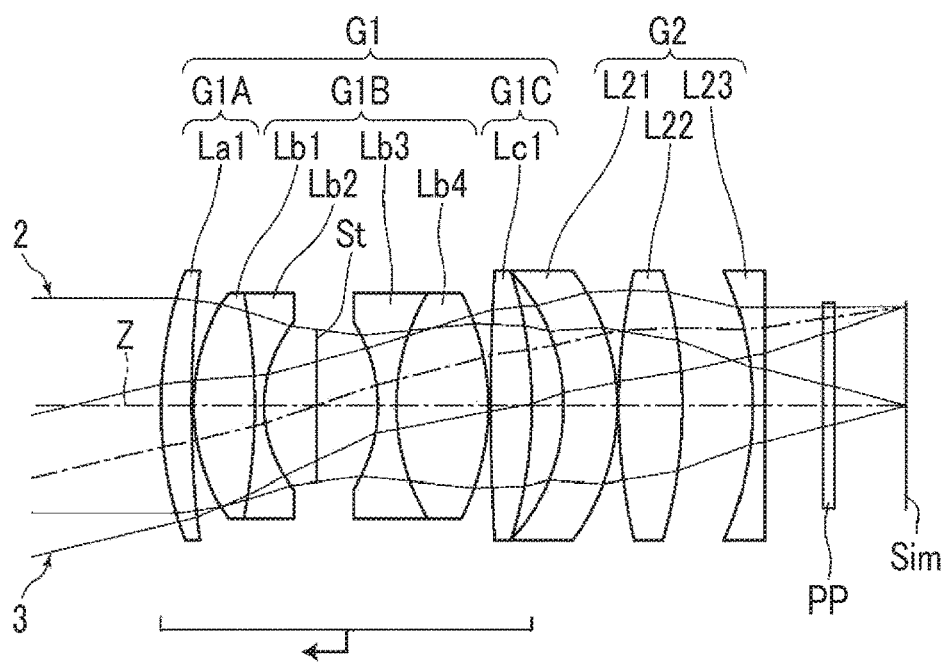
FIG. 2 is a cross-sectional view illustrating a configuration and an optical path of an imaging lens of Example 2 of the present invention.
Figure 3:
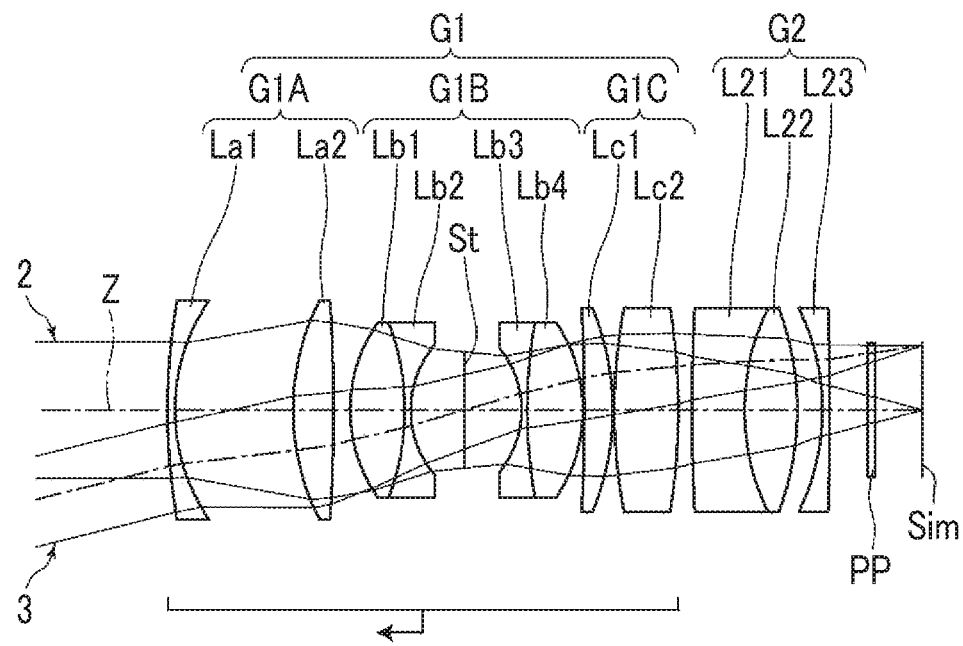
FIG. 3 is a cross-sectional view illustrating a configuration and an optical path of an imaging lens of Example 3 of the present invention.
Figure 4:
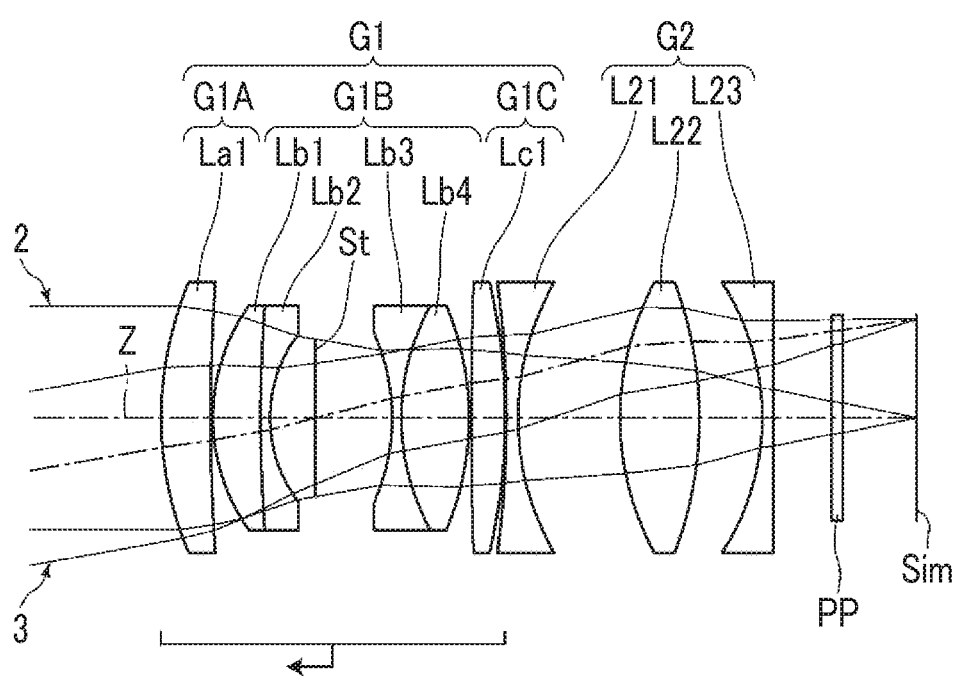
FIG. 4 is a cross-sectional view illustrating a configuration and an optical path of an imaging lens of Example 4 of the present invention.
Figure 5:
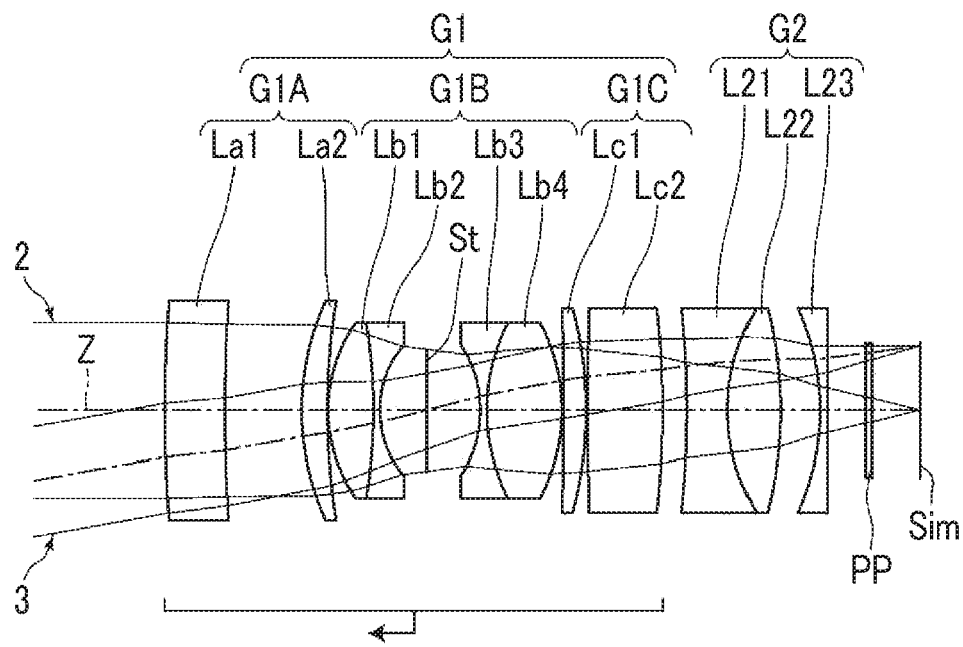
FIG. 5 is a cross-sectional view illustrating a configuration and an optical path of an imaging lens of Example 5 of the present invention.
Figure 6:
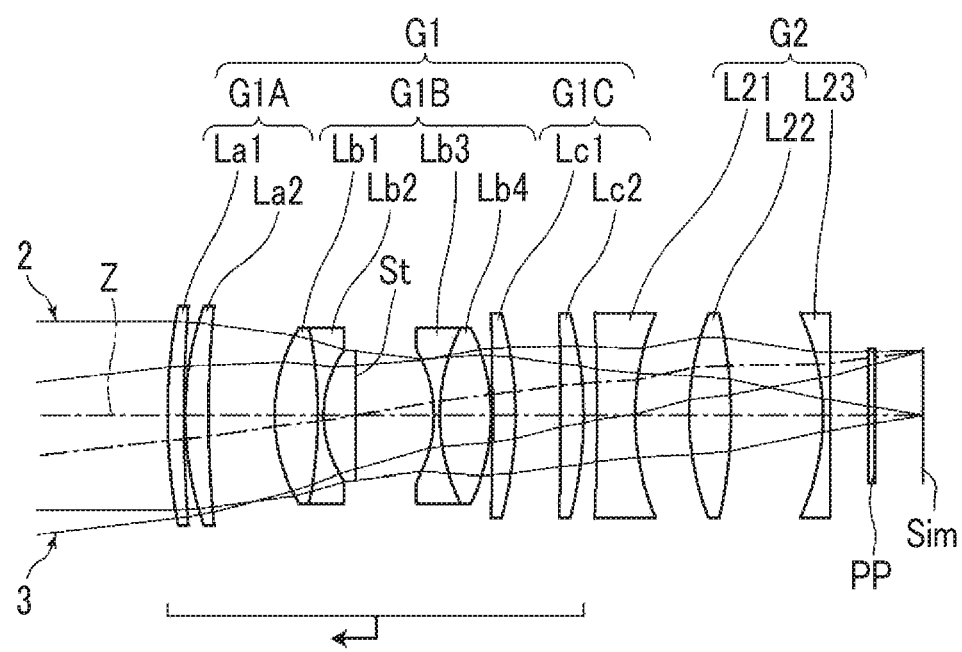
FIG. 6 is a cross-sectional view illustrating a configuration and an optical path of an imaging lens of Example 6 of the present invention.

The three lenses composing the second lens group G2 can have various aspects. In the example of FIG. 1, the lens L22 and the lens L23 are cemented with each other. Thereby, there is an advantage in correcting lateral chromatic aberration. In the examples of FIGS. 3 and 5, the lens L21 and the lens L22 are cemented with each other. Thereby, there is an advantage in correcting longitudinal chromatic aberration. The lens L21 in the example of FIG. 2 is a negative meniscus lens concave toward the object side. Thereby, there is an advantage in correcting spherical aberration. In the examples of FIGS. 4 and 6, the air gap between the lens L21 and the lens L22 and the air gap between the lens L22 and the lens L23 are set to be large. Thereby, there is an advantage in correcting coma aberration.

Next, a configuration relating to Conditional Expression of the imaging lens of the present embodiment will be described. Assuming that a distance on the optical axis from an object side surface of the b1 lens Lb1 to an image side surface of the b2 lens Lb2 is Db12 and a distance on the optical axis from a surface closest to the object side in the first lens group G1 to a surface closest to the image side in the first lens group G1 is DG1, this imaging lens is configured to satisfy Conditional Expression (1). By not allowing the result of Conditional Expression (1) to be equal to or less than the lower limit, it is possible to satisfactorily correct field curvature. By not allowing the result of Conditional Expression (1) to be equal to or greater than the upper limit, it is possible to prevent the field curvature from being excessively corrected. In order to enhance the effect relating to Conditional Expression (1), it is preferable that Conditional Expression (1-1) is satisfied.

$$0.1 < Db12/DG1 < 0.25 \qquad (1)$$

$$0.12 < Db12/DG1 < 0.22 \qquad (1\text{-}1)$$

Further, assuming that a maximum image height is Ymax, a total number of lens surfaces of the second lens group G2 is k, a refractive index of a medium, which forms an i-th lens surface from the object side in the second lens group G2 in a case where i is a natural number of 1 or more, on the object side at a d line is Nif, a refractive index of the medium, which forms the i-th lens surface from the object side in the second lens group G2, on the image side at the d line is Nir, and a radius of curvature of the i-th lens surface from the object side in the second lens group G2 is sRi, this imaging lens is configured to satisfy Conditional Expression (2). Conditional expression (2) relates to the Petzval sum of the lens surface of the second lens group G2. By making a configuration so as to satisfy the range of Conditional Expression (2), it is possible to suppress fluctuation in astigmatism during focusing. In order to enhance the effect relating to Conditional Expression (2), it is preferable that Conditional Expression (2-1) is satisfied.

$$-0.02 < Y\max \times \sum_{i=1}^{k} \left( \frac{1}{Nif} - \frac{1}{Nir} \right) \Big/ sRi < 0.08 \qquad (2)$$

$$-0.01 < Y\max \times \sum_{i=1}^{k} \left( \frac{1}{Nif} - \frac{1}{Nir} \right) \Big/ sRi < 0.07 \qquad (2\text{-}1)$$

Assuming that a radius of curvature of the image side surface of the b2 lens Lb2 is Rb2r, and a radius of curvature of an object side surface of the b3 lens Lb3 is Rb3f, it is preferable that this imaging lens satisfies Conditional Expression (3). Conditional expression (3) relates to a shape of an air lens formed by the image side surface of the b2 lens Lb2 and the object side surface of the b3 lens Lb3. By making a configuration so as to satisfy the range of conditional expression (3), coma aberration can be suppressed. In order to enhance the effect relating to Conditional Expression (3), it is preferable that Conditional Expression (3-1) is satisfied.

$$-0.3 < (Rb2r+Rb3f)/(Rb2r-Rb3f) < 0.3 \qquad (3)$$

$$-0.2 < (Rb2r+Rb3f)/(Rb2r-Rb3f) < 0.1 \qquad (3\text{-}1)$$

Further, assuming that a focal length of the whole system during focusing on the object at infinity is f, and a focal length of the second lens group G2 is f2, it is preferable that this imaging lens satisfies Conditional Expression (4). By not allowing the result of Conditional Expression (4) to be equal to or less than the lower limit, it is possible to suppress fluctuation in spherical aberration and astigmatism during focusing. By not allowing the result of Conditional Expression (4) to be equal to or greater than the upper limit, it is possible to ensure the refractive power of the first lens group G1 and to suppress the amount of movement of the first lens group G1 during focusing. In order to enhance the effect relating to Conditional Expression (4), it is preferable that Conditional Expression (4-1) is satisfied.

$$-0.7 < f/f2 < 0.3 \qquad (4)$$

$$-0.6 < f/f2 < 0.2 \qquad (4\text{-}1)$$

Further, assuming that a focal length of the whole system during focusing on the object at infinity is f, a focal length of a j-th lens from the object side in the second lens group G2 in a case where j is an integer of 1 to 3 is f2j, and an Abbe number of the j-th lens from the object side in the second lens group G2 at the d line is v2j, it is preferable that this imaging lens satisfies Conditional Expression (5). By making a configuration so as to satisfy the range of Conditional Expression (5), it is possible to suppress fluctuation in lateral chromatic aberration during focusing. In order to enhance the effect relating to Conditional Expression (5), it is preferable that Conditional Expression (5-1) is satisfied.

$$-0.05 < f \times \sum_{j=1}^{3} \frac{1}{f2j \times v2j} < -0.005 \qquad (5)$$

$$-0.035 < f \times \sum_{j=1}^{3} \frac{1}{f2j \times v2j} < -0.01 \qquad (5\text{-}1)$$

Further, assuming that a radius of curvature of an object side surface of the b3 lens Lb3 is Rb3f, and a radius of curvature of an image side surface of the b3 lens Lb3 is Rb3r, it is preferable that this imaging lens satisfies Conditional Expression (6). By not allowing the result of Conditional Expression (6) to be equal to or less than the lower limit, it is possible to prevent spherical aberration from being excessively corrected. By not allowing the result of Conditional Expression (6) to be equal to or greater than the upper limit, there is an advantage in correcting spherical aberration and suppressing the difference in spherical aberration for each wavelength. In order to enhance the effect relating to Conditional Expression (6), it is more preferable that Conditional Expression (6-1) is satisfied.

$$-0.8 < (Rb3f+Rb3r)/(Rb3f-Rb3r) < 0 \qquad (6)$$

$$-0.75 < (Rb3f+Rb3r)/(Rb3f-Rb3r) < -0.05 \qquad (6\text{-}1)$$

Further, assuming that a radius of curvature of an object side surface of the b2 lens Lb2 is Rb2f, and a radius of curvature of the image side surface of the b2 lens Lb2 is Rb2r, it is preferable that this imaging lens satisfies Conditional Expression (7). By not allowing the result of Conditional Expression (7) to be equal to or less than the lower limit, there is an advantage in correcting spherical aberration and suppressing the difference in spherical aberration for each wavelength. By not allowing the result of Conditional Expression (7) to be equal to or greater than the upper limit, it is possible to prevent spherical aberration from being excessively corrected. In order to enhance the effect relating to Conditional Expression (7), it is more preferable that Conditional Expression (7-1) is satisfied.

$$0.3 < (Rb2f+Rb2r)/(Rb2f-Rb2r) < 1.5 \qquad (7)$$

$$0.35 < (Rb2f+Rb2r)/(Rb2f-Rb2r) < 1.2 \qquad (7\text{-}1)$$

The above-mentioned preferred configurations and/or available configurations may be optional combinations, and it is preferable to selectively adopt the configurations in accordance with required specification. According to the present embodiment, it is possible to realize an imaging lens having a small field curvature and favorable optical performance by suppressing fluctuation in astigmatism during focusing.

Next, numerical examples of the imaging lens of the present invention will be described.

Example 1

A lens configuration of an imaging lens of Example 1 is shown in FIG. 1, and a configuration and a method thereof shown in the drawing is as described above. Therefore, repeated description is partially omitted herein. The imaging lens of Example 1 consists of, in order from the object side, a first lens group G1 having a positive refractive power, and a second lens group G2 having a positive refractive power. During focusing from the object at infinity to the close-range object, the entire first lens group G1 integrally moves from the image side to the object side, and the second lens group G2 remains stationary with respect to the image plane Sim. The first lens group G1 consists of, in order from the object side, a first-A sub-lens group G1A having a positive refractive power, a first-B sub-lens group G1B, and a first-C sub-lens group G1C having a positive refractive power. The first-A sub-lens group G1A consists of two lenses La1 and La2 in order from the object side. The first-B sub-lens group G1B consists of, in order from the object side, a b1 lens Lb1, a b2 lens Lb2, an aperture stop St, a b3 lens Lb3, and a b4 lens Lb4. The first-C sub-lens group G1C consists of two lenses Lc1 and Lc2 in order from the object side. The second lens group G2 consists of three lenses L21 to L23 in order from the object side. The schematic configuration of the imaging lens of Example 1 is as described above.

Table 1 shows basic lens data of the imaging lens of Example 1, and Table 2 shows specification and variable surface distances. In Table 1, R is the radius of curvature of each surface, D is the surface distance, Nd is the refractive index at the d line (a wavelength of 587.6 nm (nanometers)), and νd is the Abbe number based on the d line. Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D indicates a distance between the image plane Sim and the surface closest to the image side in the table. In Table 1, the variable surface distances, which are variable during focusing, are referenced by the reference signs DD[ ], and are written into places of D, where object side surface numbers of spacings are noted in [ ].

In Table 2, the values of the focal length f of the whole system bringing the object at infinity into focus, the focal length near of the whole system bringing the object at an object distance of 0.2 m (meters) into focus, the F number FNo, the maximum total angle of view 2ω, and the variable surface distance are shown based on the d line. (°) in the place of 2ω indicates that the unit thereof is a degree. In Table 2, the column denoted by "Infinity" shows respective values thereof in a state where the object at infinity is in focus, and the column denoted by "0.2 m" shows respective values thereof in a state where the object at the object distance of 0.2 m is in focus.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | νd |
|---|---|---|---|---|
| 1 | 80.49545 | 1.000 | 1.77250 | 49.60 |
| 2 | 27.66900 | 21.482 | | |
| 3 | 50.50962 | 4.562 | 1.83481 | 42.72 |
| 4 | −125.73063 | 1.780 | | |
| 5 | 21.16426 | 9.795 | 1.59522 | 67.73 |
| 6 | −28.95220 | 0.810 | 1.53172 | 48.84 |
| 7 | 12.96142 | 5.184 | | |
| 8(St) | ∞ | 4.414 | | |
| 9 | −13.49552 | 0.800 | 1.80100 | 34.97 |
| 10 | 79.02192 | 6.237 | 1.59522 | 67.73 |
| 11 | −20.16565 | 0.200 | | |
| 12 | −212.84630 | 3.504 | 1.65160 | 58.55 |
| 13 | −33.02585 | 0.200 | | |
| 14 | 82.58302 | 5.925 | 1.65160 | 58.55 |
| 15 | −42.53843 | DD[15] | | |
| 16 | 22.68328 | 5.490 | 1.84666 | 23.78 |
| 17 | 17.02745 | 2.255 | | |
| 18 | 53.20440 | 7.000 | 1.61800 | 63.33 |
| 19 | −18.76501 | 4.869 | 1.61293 | 37.00 |
| 20 | 2798710.75014 | 5.000 | | |
| 21 | ∞ | 1.000 | 1.51633 | 64.14 |
| 22 | ∞ | 6.279 | | |

TABLE 2

Example 1

| | Infinity | 0.2 m |
|---|---|---|
| f | 25.766 | — |
| fnear | — | 26.152 |
| FNo. | 1.86 | 2.06 |
| 2ω(°) | 39.6 | 37.0 |
| DD[15] | 0.100 | 4.686 |

Figure 7:
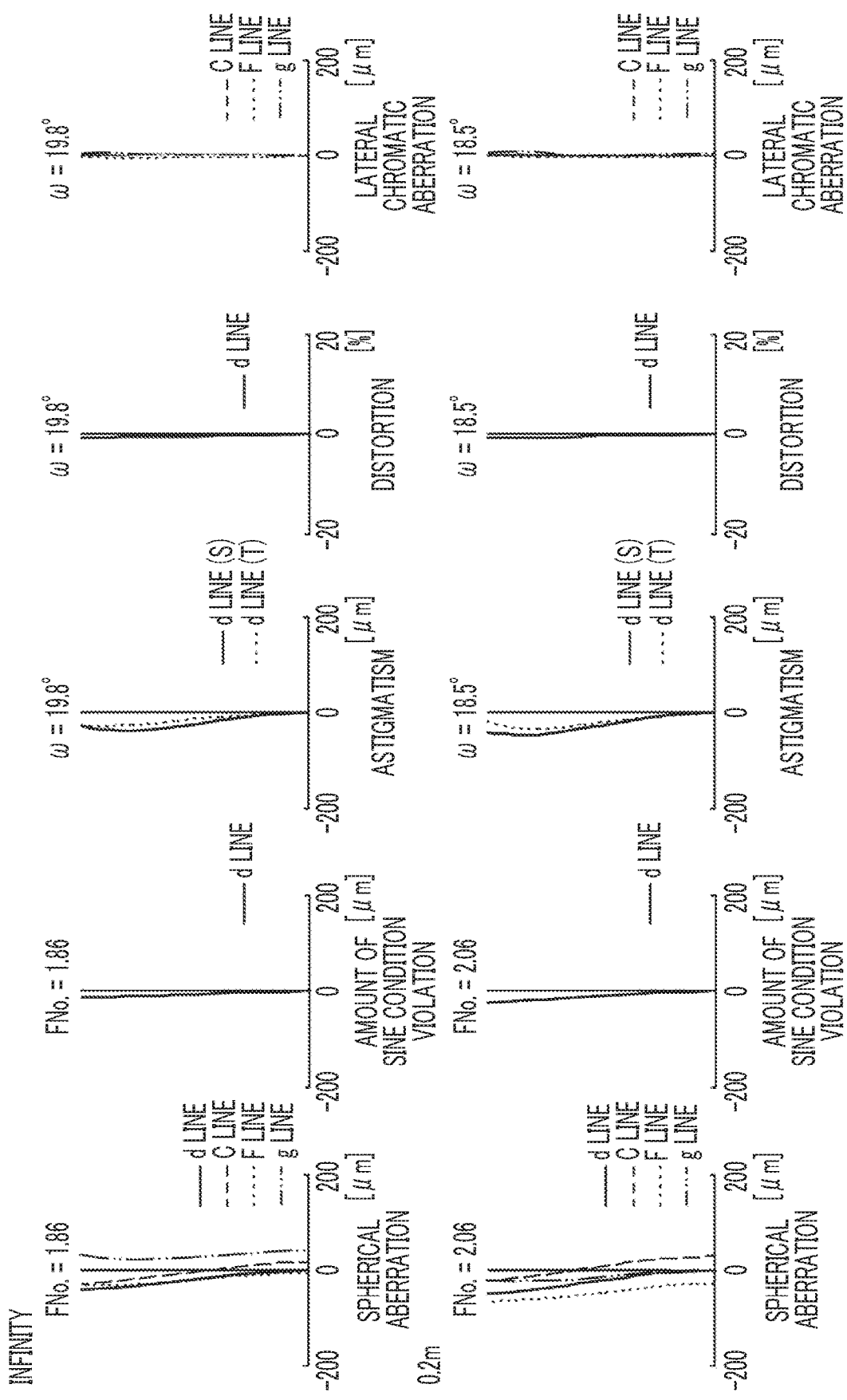
FIG. 7 is a diagram of aberrations of the imaging lens of Example 1 of the present invention, where the diagram includes spherical aberration diagram, astigmatism diagram, distortion diagram, and lateral chromatic aberration diagram, in order from the left side thereof.

FIG. 7 shows a diagram of aberrations of the imaging lens of Example 1. FIG. 7 shows spherical aberrations, amounts of sine condition violation, astigmatisms, distortions, and lateral chromatic aberrations are shown in order from the left side. In FIG. 7, a state where an object at infinity is in focus is shown in the upper part labeled as "infinity", and a state where an object having an object distance of "0.2 m" is in focus is shown in the lower part labeled as "0.2 m (meters)". In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the black solid line, the long dashed line, the short dashed line, and the chain double-dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line, the F line, and the g line are respectively indicated by the long dashed line, the short dashed line, and the chain double-dashed line. In the spherical aberration diagram, FNo. indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 8:
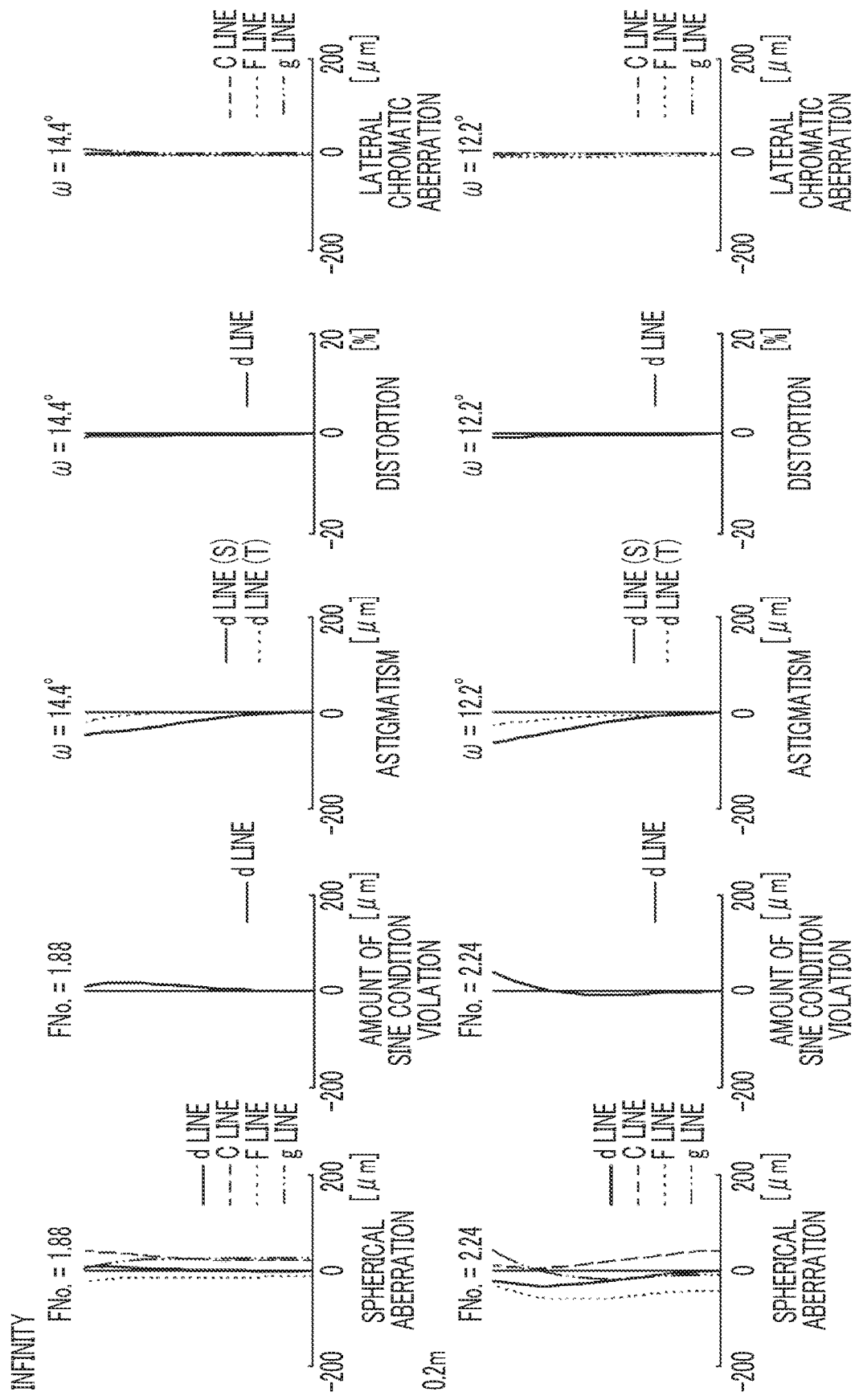
FIG. 8 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 shows a lens configuration of the imaging lens of Example 2. The schematic configuration of the imaging lens of Example 2 is the same as that of Example 1 except that the first-A sub-lens group G1A consists of one lens La1 and the first-C sub-lens group G1C consists of one lens Lc1. Table 3 shows basic lens data of the imaging lens of Example 2, Table 4 shows specification and variable surface distances, and FIG. 8 shows aberration diagrams thereof.

TABLE 3

Example 2

| Surface Number | R | D | Nd | vd |
|---|---|---|---|---|
| 1 | 34.68409 | 2.659 | 1.83481 | 42.72 |
| 2 | 96.72661 | 0.200 | | |
| 3 | 18.60318 | 5.183 | 1.61800 | 63.33 |
| 4 | -53.11140 | 0.810 | 1.54072 | 47.23 |
| 5 | 12.03665 | 4.547 | | |
| 6(St) | ∞ | 5.353 | | |
| 7 | -14.25088 | 1.620 | 1.61293 | 37.00 |
| 8 | 19.92789 | 8.000 | 1.61800 | 63.33 |
| 9 | -22.47644 | 0.200 | | |
| 10 | 203.35067 | 3.511 | 1.83481 | 42.72 |
| 11 | -41.27145 | DD[11] | | |
| 12 | -17.81903 | 4.662 | 1.84666 | 23.78 |
| 13 | -20.44061 | 0.100 | | |
| 14 | 52.53768 | 5.570 | 1.61800 | 63.33 |
| 15 | -42.34645 | 6.070 | | |
| 16 | -30.22328 | 1.000 | 1.75520 | 27.51 |
| 17 | 2525252.52525 | 5.000 | | |
| 18 | ∞ | 1.000 | 1.51633 | 64.14 |
| 19 | ∞ | 6.231 | | |

TABLE 4

Example 2

| | Infinity | 0.2 m |
|---|---|---|
| f | 36.019 | — |
| fnear | — | 37.710 |
| FNo. | 1.88 | 2.24 |
| 2ω(°) | 28.8 | 24.4 |
| DD[11] | 2.790 | 13.268 |

Example 3

Figure 9:
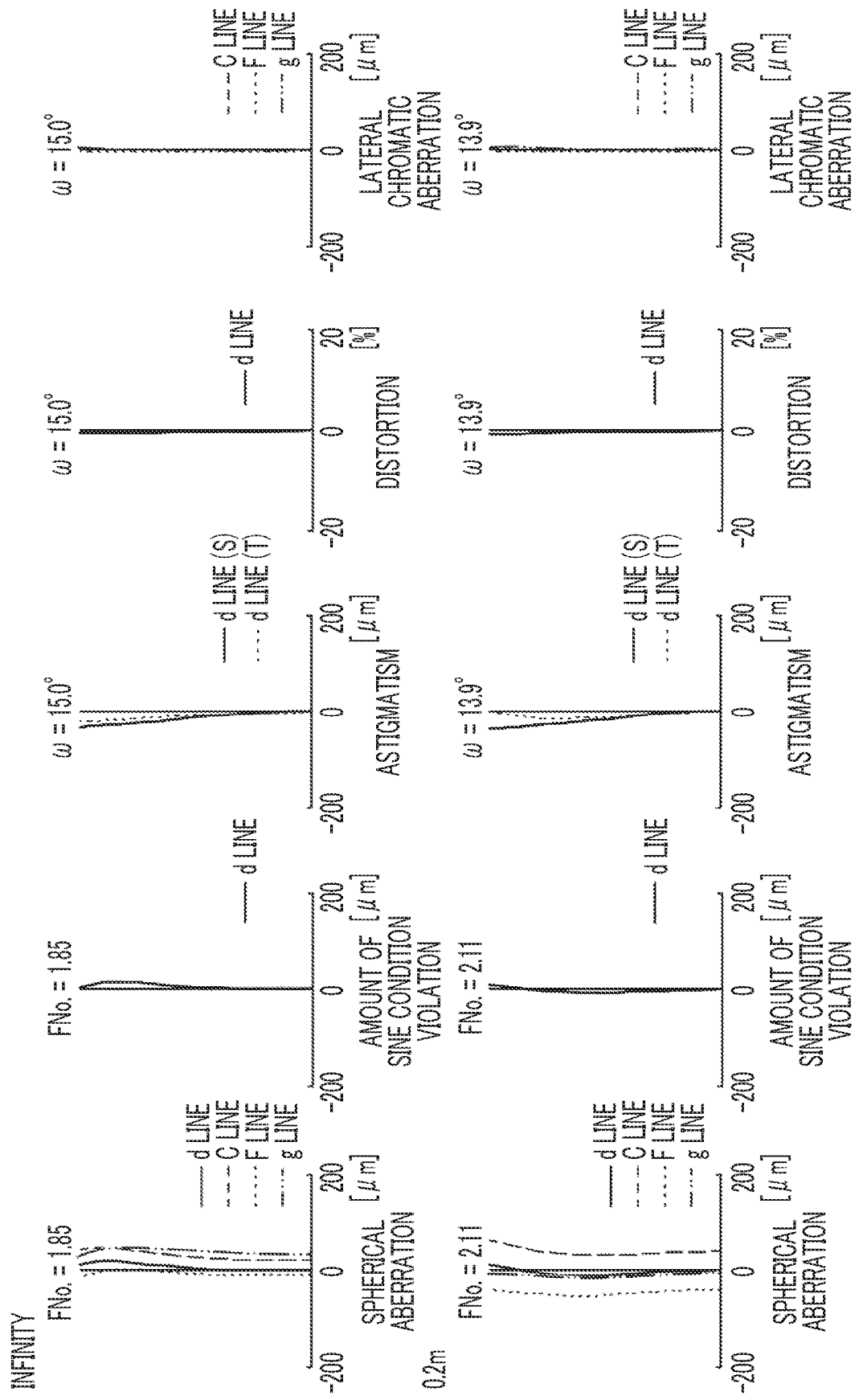
FIG. 9 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 shows a lens configuration of the imaging lens of Example 3. The schematic configuration of the imaging lens of Example 3 is the same as that of Example 1 except that the second lens group G2 has a negative refractive power. Table 5 shows basic lens data of the imaging lens of Example 3, Table 6 shows specification and variable surface distances, and FIG. 9 shows aberration diagrams thereof.

TABLE 5

Example 3

| Surface Number | R | D | Nd | vd |
|---|---|---|---|---|
| 1 | 90.39228 | 1.000 | 1.67270 | 32.10 |
| 2 | 27.11437 | 15.722 | | |
| 3 | 33.68542 | 5.401 | 1.80000 | 29.84 |
| 4 | -232.99734 | 2.194 | | |
| 5 | 21.30913 | 7.260 | 1.61800 | 63.33 |
| 6 | -34.56535 | 0.800 | 1.62004 | 36.26 |
| 7 | 14.03959 | 7.142 | | |
| 8(St) | ∞ | 7.481 | | |
| 9 | -13.83387 | 0.800 | 1.63980 | 34.47 |
| 10 | 72.48789 | 7.398 | 1.61800 | 63.33 |
| 11 | -21.80272 | 0.200 | | |
| 12 | -264.07626 | 3.762 | 1.65160 | 58.55 |
| 13 | -37.16619 | 0.200 | | |
| 14 | 76.83307 | 8.552 | 1.65160 | 58.55 |
| 15 | -85.69829 | DD[15] | | |
| 16 | 267.06657 | 7.010 | 1.51680 | 64.20 |
| 17 | 32.62510 | 7.000 | 1.61800 | 63.33 |
| 18 | -41.27857 | 3.364 | | |
| 19 | -32.59003 | 1.000 | 1.91082 | 35.25 |
| 20 | -426.72108 | 5.000 | | |
| 21 | ∞ | 1.000 | 1.51633 | 64.14 |
| 22 | ∞ | 6.295 | | |

TABLE 6

Example 3

| | Infinity | 0.2 m |
|---|---|---|
| f | 34.489 | — |
| fnear | — | 33.716 |
| FNo. | 1.85 | 2.11 |
| 2ω(°) | 30.0 | 27.8 |
| DD[15] | 1.779 | 8.119 |

Example 4

Figure 10:
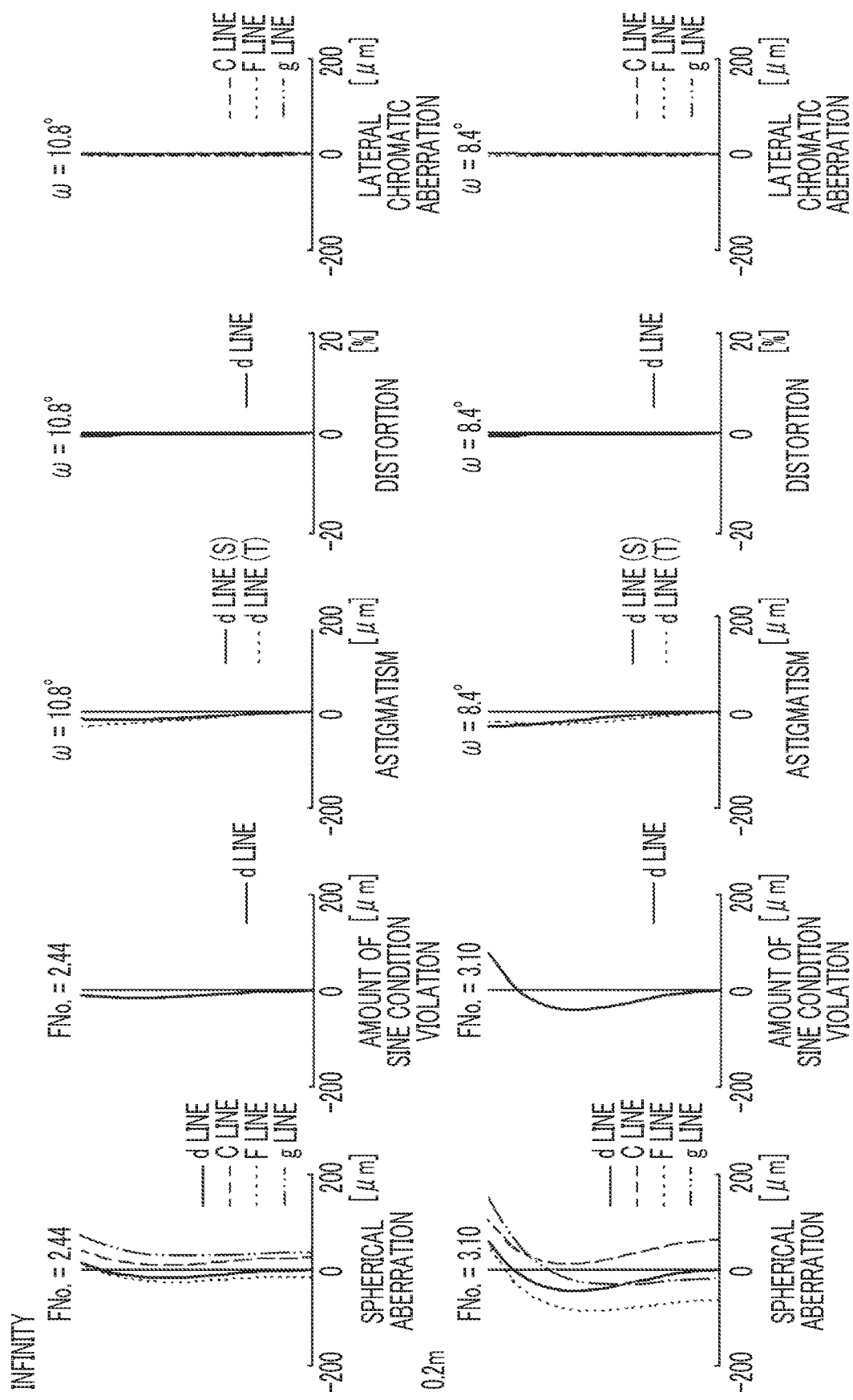
FIG. 10 is a diagram of aberrations of the imaging lens of Example 4 of the present invention, where the diagram includes spherical aberration diagram, astigmatism diagram, distortion diagram, and lateral chromatic aberration diagram, in order from the left side thereof.

FIG. 4 shows a lens configuration of the imaging lens of Example 4. The schematic configuration of the imaging lens of Example 4 is the same as that of Example 1 except that the second lens group G2 has a negative refractive power and the first-A sub-lens group G1A consists of one lens La1 and the first-C sub-lens group G1C consists of one lens Lc1. Table 7 shows basic lens data of the imaging lens of Example 4, Table 8 shows specification and variable surface distances, and FIG. 10 shows aberration diagrams thereof.

TABLE 7

Example 4

| Surface Number | R | D | Nd | vd |
|---|---|---|---|---|
| 1 | 31.58357 | 4.283 | 1.77250 | 49.60 |
| 2 | 177.00608 | 0.200 | | |
| 3 | 17.68049 | 4.135 | 1.61800 | 63.33 |
| 4 | 139.41731 | 0.810 | 1.58144 | 40.75 |
| 5 | 12.64057 | 3.960 | | |
| 6(St) | ∞ | 6.622 | | |
| 7 | -18.91744 | 0.810 | 1.60342 | 38.03 |
| 8 | 21.15389 | 5.846 | 1.61800 | 63.33 |
| 9 | -26.72950 | 0.200 | | |
| 10 | 364.10127 | 2.871 | 1.85026 | 32.27 |
| 11 | -57.09427 | DD[11] | | |
| 12 | -96.19095 | 1.000 | 1.51742 | 52.43 |
| 13 | 24.56826 | 8.855 | | |
| 14 | 25.90085 | 6.874 | 1.61800 | 63.33 |

TABLE 7-continued

Example 4

| Surface Number | R | D | Nd | vd |
|---|---|---|---|---|
| 15 | -34.66855 | 5.437 | | |
| 16 | -22.50359 | 1.000 | 1.51742 | 52.43 |
| 17 | -3450517.22686 | 5.000 | | |
| 18 | ∞ | 1.000 | 1.51633 | 64.14 |
| 19 | ∞ | 6.356 | | |

TABLE 8

Example 4

| | Infinity | 0.2 m |
|---|---|---|
| f | 48.512 | — |
| fnear | — | 48.386 |
| FNo. | 2.44 | 3.10 |
| 2ω(°) | 21.6 | 16.8 |
| DD[11] | 0.100 | 12.677 |

Example 5

Figure 11:
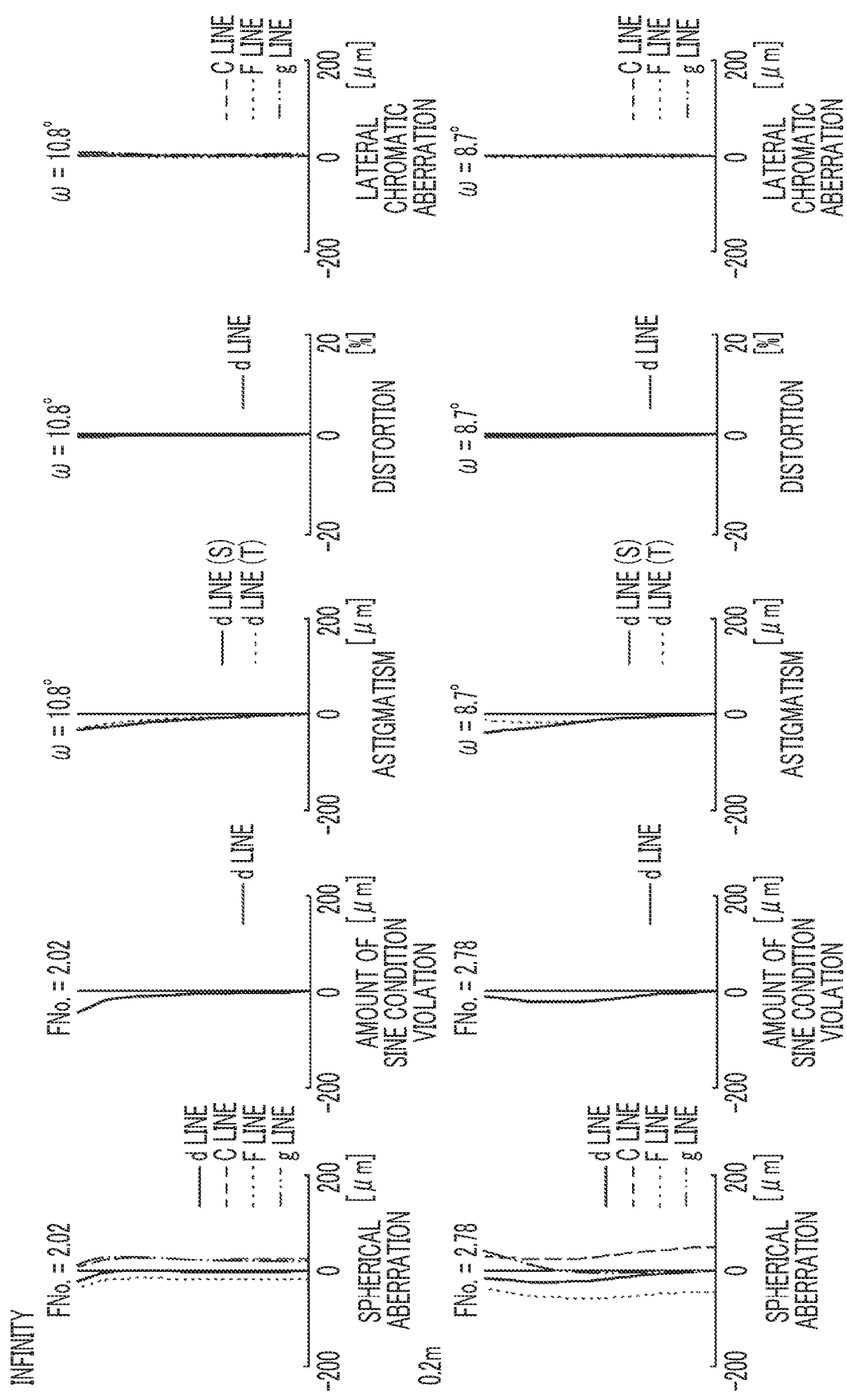
FIG. 11 is a diagram of aberrations of the imaging lens of Example 5 of the present invention, where the diagram includes spherical aberration diagram, astigmatism diagram, distortion diagram, and lateral chromatic aberration diagram, in order from the left side thereof.

FIG. 5 shows a lens configuration of the imaging lens of Example 5. The schematic configuration of the imaging lens of Example 5 is the same as that of Example 1. Table 9 shows basic lens data of the imaging lens of Example 5, Table 10 shows specification and variable surface distances, and FIG. 11 shows aberration diagrams thereof.

TABLE 9

Example 5

| Surface Number | R | D | Nd | vd |
|---|---|---|---|---|
| 1 | 196.68312 | 8.000 | 1.84666 | 23.78 |
| 2 | 231.74740 | 10.114 | | |
| 3 | 36.79526 | 3.406 | 1.65160 | 58.55 |
| 4 | 96.97495 | 0.100 | | |
| 5 | 21.26741 | 6.059 | 1.61800 | 63.33 |
| 6 | -74.59290 | 0.810 | 1.53172 | 48.84 |
| 7 | 14.04541 | 6.280 | | |
| 8(St) | ∞ | 7.135 | | |
| 9 | -16.73696 | 0.870 | 1.56732 | 42.82 |
| 10 | 26.82531 | 10.000 | 1.61800 | 63.33 |
| 11 | -26.02106 | 0.200 | | |
| 12 | -548.42711 | 3.021 | 1.65160 | 58.55 |
| 13 | -55.25956 | 0.200 | | |
| 14 | 491.08260 | 10.000 | 1.65160 | 58.55 |
| 15 | -119.76110 | DD[15] | | |
| 16 | -131.93625 | 5.395 | 1.59551 | 39.24 |
| 17 | 27.23360 | 7.000 | 1.83481 | 42.72 |
| 18 | -56.44266 | 5.227 | | |
| 19 | -34.56818 | 1.000 | 1.69895 | 30.13 |
| 20 | 2777777.77780 | 5.000 | | |
| 21 | ∞ | 1.000 | 1.51633 | 64.14 |
| 22 | ∞ | 6.328 | | |

TABLE 10

Example 5

| | Infinity | 0.2 m |
|---|---|---|
| f | 48.515 | — |
| fnear | — | 49.270 |
| FNo. | 2.02 | 2.78 |

TABLE 10-continued

Example 5

| | Infinity | 0.2 m |
|---|---|---|
| 2ω(°) | 21.6 | 17.4 |
| DD[15] | 3.219 | 20.288 |

Example 6

Figure 12:
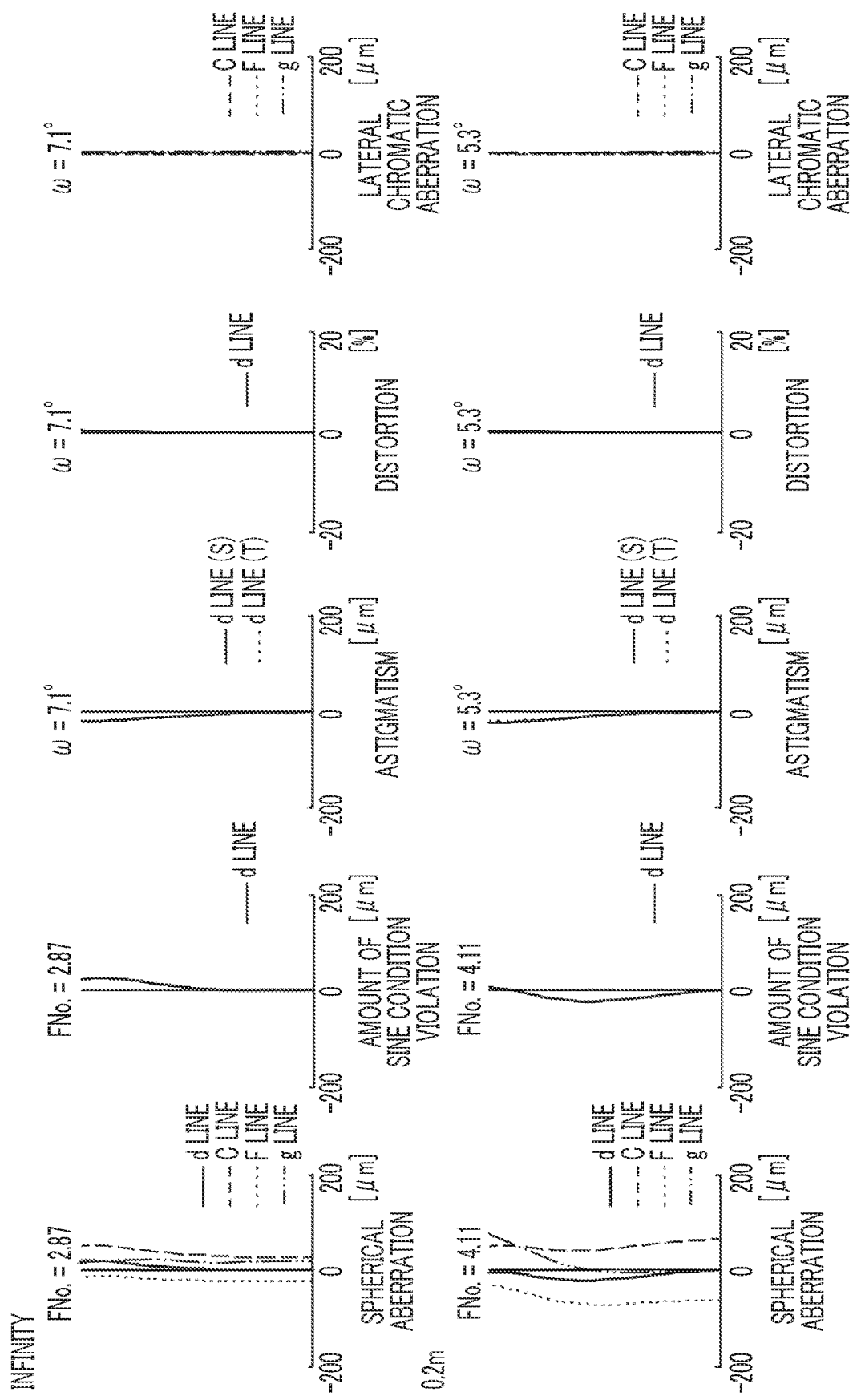
FIG. 12 is a diagram of aberrations of the imaging lens of Example 6 of the present invention, where the diagram includes spherical aberration diagram, astigmatism diagram, distortion diagram, and lateral chromatic aberration diagram, in order from the left side thereof.

FIG. 6 shows a lens configuration of the imaging lens of Example 6. The schematic configuration of the imaging lens of Example 6 is the same as that of Example 1 except that the second lens group G2 has a negative refractive power. Table 11 shows basic lens data of the imaging lens of Example 6, Table 12 shows specification and variable surface distances, and FIG. 12 shows aberration diagrams thereof.

TABLE 11

Example 6

| Surface Number | R | D | Nd | vd |
|---|---|---|---|---|
| 1 | 81.13544 | 2.160 | 1.51680 | 64.20 |
| 2 | 179.04208 | 0.200 | | |
| 3 | 46.96191 | 3.104 | 1.48749 | 70.24 |
| 4 | 150.89626 | 8.667 | | |
| 5 | 23.89978 | 5.740 | 1.59522 | 67.73 |
| 6 | -63.16465 | 0.800 | 1.51680 | 64.20 |
| 7 | 16.22957 | 4.210 | | |
| 8(St) | ∞ | 10.457 | | |
| 9 | -18.84784 | 0.810 | 1.54814 | 45.78 |
| 10 | 27.45218 | 6.814 | 1.59522 | 67.73 |
| 11 | -28.03959 | 0.200 | | |
| 12 | -500.88226 | 3.064 | 1.48749 | 70.24 |
| 13 | -53.29564 | 6.011 | | |
| 14 | -606.83460 | 3.069 | 1.48749 | 70.24 |
| 15 | -54.36419 | DD[15] | | |
| 16 | -274.92257 | 5.047 | 1.84666 | 23.78 |
| 17 | 36.72507 | 7.240 | | |
| 18 | 39.45725 | 5.512 | 1.76182 | 26.52 |
| 19 | -64.14717 | 12.150 | | |
| 20 | -33.51306 | 1.000 | 1.60342 | 38.03 |
| 21 | 2655633.20542 | 5.000 | | |
| 22 | ∞ | 1.000 | 1.51633 | 64.14 |
| 23 | ∞ | 6.338 | | |

TABLE 12

Example 6

| | Infinity | 0.2 m |
|---|---|---|
| f | 73.508 | — |
| fnear | — | 58.968 |
| FNo. | 2.87 | 4.11 |
| 2ω(°) | 14.2 | 10.6 |
| DD[15] | 1.806 | 27.561 |

Table 13 shows values corresponding to Conditional Expressions (1) to (7) relating to the imaging lenses of Examples 1 to 6. The values shown in Table 13 are based on the d line.

TABLE 13

| Expression Number | | Example 1 | Example 2 | Example 3 | Example 4 | Example 5 | Example 6 |
|---|---|---|---|---|---|---|---|
| (1) | Db12/DG1 | 0.189 | 0.211 | 0.146 | 0.185 | 0.130 | 0.152 |
| (2) | Ymax × Σ(1/Nif − 1/Nir)/sRi | −0.005 | 0.011 | 0.025 | 0.060 | 0.032 | 0.068 |
| (3) | (Rb2r + Rb3f)/(Rb2r − Rb3f) | −0.020 | −0.084 | 0.007 | −0.199 | −0.087 | −0.075 |
| (4) | f/f2 | 0.100 | 0.182 | −0.131 | −0.009 | 0.049 | −0.598 |
| (5) | f × Σ(1/(f2j × v2j)) | −0.013 | −0.020 | −0.015 | −0.015 | −0.016 | −0.032 |
| (6) | (Rb3f + Rb3r)/(Rb3f − Rb3r) | −0.708 | −0.166 | −0.679 | −0.056 | −0.232 | −0.186 |
| (7) | (Rb2f + Rb2r)/(Rb2f − Rb2r) | 0.382 | 0.630 | 0.422 | 1.199 | 0.683 | 0.591 |

As can be seen from the above data, in the imaging lenses of Examples 1 to 6, fluctuation in astigmatism during focusing is suppressed, field curvature is small, each aberration is satisfactorily corrected, and thus high optical performance is realized. Further, the imaging lenses of Examples 1 to 6 each have a total angle of view of 45° or less, and each are a lens system suitable as a telephoto type.

Figure 13:
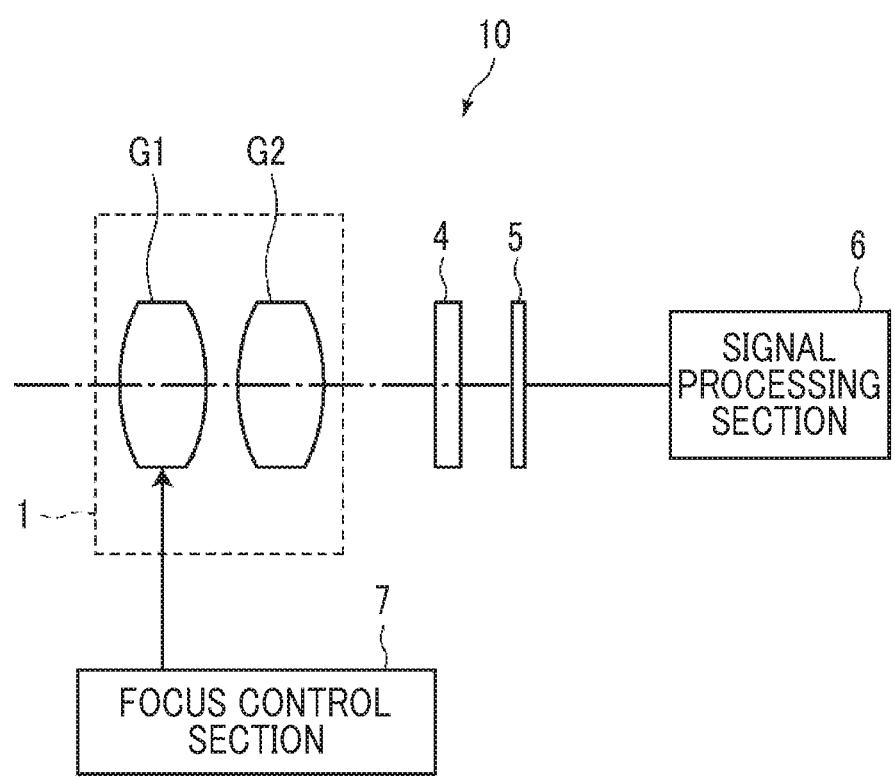
FIG. 13 is a schematic configuration diagram of an imaging apparatus according to an embodiment of the present invention.

Next, an imaging apparatus according to an embodiment of the present invention will be described. FIG. 13 is a schematic configuration diagram of an imaging apparatus 10 using the imaging lens 1 according to the above-mentioned embodiment of the present invention as an example of an imaging apparatus of an embodiment of the present invention. As the imaging apparatus 10, for example, there is an FA camera, an MV camera, or a surveillance camera.

The imaging apparatus 10 comprises: the imaging lens 1; a filter 4 that is disposed on the image side in the imaging lens 1; an imaging element 5; a signal processing section 6 that performs processing of calculating a signal which is output from the imaging element 5, and a focus control section 7 that is for performing focusing of the imaging lens 1. FIG. 13 schematically shows the first lens group G1 and the second lens group G2 which are belonging to the imaging lens 1. The imaging element 5 captures an image of a subject, which is formed through the imaging lens 1, and converts the image into an electrical signal. For example, charge coupled device (CCD), complementary metal oxide semiconductor (CMOS), or the like may be used. The imaging element 5 is disposed such that the imaging surface thereof is coplanar with the image plane of the imaging lens 1. The imaging apparatus 10 of the present embodiment comprises the imaging lens 1. Thus, it is possible to appropriately cope with a change in object distance, and it is possible to acquire a favorable image.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

For example, in each example, the lens system, which performs focusing from the object at infinity to the close-range object, is used. However, it is needless to say that the present invention can be applied to an imaging lens which performs focusing from a distant object at a finite distance to a close-range object.

The imaging apparatus according to the above-mentioned embodiment of the present invention is not limited to the above-mentioned examples, and may be modified into various forms such as a digital camera and an in-vehicle camera.

What is claimed is:

1. An imaging lens consisting of, in order from an object side:
   a first lens group that moves toward the object side during focusing from a distant object to a close-range object and has a positive refractive power; and
   a second lens group that remains stationary with respect to an image plane during focusing,
   wherein the first lens group has a first-B sub-lens group including an aperture stop in an inside thereof,
   wherein the first-B sub-lens group consists of, in order from the object side, a b1 lens which is a positive lens, a b2 lens which is a negative lens concave toward an image side, an aperture stop, a b3 lens which is a negative lens concave toward the object side, and a b4 lens which is a positive lens,
   wherein the second lens group consists of, in order from the object side, a negative lens, a positive lens, and a negative lens, and
   wherein assuming that
      a distance on an optical axis from an object side surface of the b1 lens to an image side surface of the b2 lens is Db12,
      a distance on the optical axis from a surface closest to the object side in the first lens group to a surface closest to the image side in the first lens group is DG1,
      a maximum image height is Ymax,
      a total number of lens surfaces of the second lens group is k,
      a refractive index of a medium, which forms an i-th lens surface from the object side in the second lens group, on the object side at a d line is Nif,
      a refractive index of the medium, which forms the i-th lens surface from the object side in the second lens group, on the image side at the d line is Nir,
      a radius of curvature of the i-th lens surface from the object side in the second lens group is sRi,
      a radius of curvature of the image side surface of the b2 lens is Rb2r, and
      a radius of curvature of an object side surface of the b3 lens is Rb3f,
   Conditional Expressions (1), (2) and (3) are satisfied, which are represented by $$0.1 < Db12/DG1 < 0.25, \tag{1}$$

$$-0.02 < Y\text{max} \times \sum_{i=1}^{k}\left(\frac{1}{Nif} - \frac{1}{Nir}\right)\bigg/ sRi < 0.08, \text{ and} \tag{2}$$

$$-0.3 < (Rb2r + Rb3f)/(Rb2r - Rb3f) < 0.3. \tag{3}$$

2. The imaging lens according to claim 1, wherein assuming that
a focal length of the imaging lens during focusing on an object at infinity is f, and
a focal length of the second lens group is f2,
Conditional Expression (4) is satisfied, which is represented by $$-0.7 < f/f2 < 0.3 \tag{4}$$

3. The imaging lens according to claim 2, wherein Conditional Expression (4-1) is satisfied, which is represented by $$-0.6 < f/f2 < 0.2 \tag{4-1}$$

4. The imaging lens according to claim 1, wherein assuming that
a focal length of the imaging lens during focusing on an object at infinity is f,
a focal length of a j-th lens from the object side in the second lens group is f2j, and
an Abbe number of the j-th lens from the object side in the second lens group at the d line is v2j,
Conditional Expression (5) is satisfied, which is represented by $$-0.05 < f \times \sum_{j=1}^{3} \frac{1}{f2j \times v2j} < -0.005. \tag{5}$$

5. The imaging lens according to claim 4, wherein Conditional Expression (5-1) is satisfied, which is represented by $$-0.035 < f \times \sum_{j=1}^{3} \frac{1}{f2j \times v2j} < -0.01. \tag{5-1}$$

6. The imaging lens according to claim 1, wherein the first lens group consists of, in order from the object side, a first-A sub-lens group having a positive refractive power, the first-B sub-lens group, and a first-C sub-lens group having a positive refractive power.

7. The imaging lens according to claim 6, wherein the first-A sub-lens group consists of one or two lenses.

8. The imaging lens according to claim 6, wherein the first-C sub-lens group consists of one or two lenses.

9. The imaging lens according to claim 1, wherein the b1 lens and the b2 lens are cemented with each other.

10. The imaging lens according to claim 1, wherein the b3 lens and the b4 lens are cemented with each other.

11. The imaging lens according to claim 1, wherein the positive lens of the second lens group is a biconvex lens.

12. The imaging lens according to claim 1, wherein Conditional Expression (1-1) is satisfied, which is represented by $$0.12 < Db12/DG1 < 0.22 \tag{1-1}$$

13. The imaging lens according to claim 1, wherein Conditional Expression (2-1) is satisfied, which is represented by $$-0.01 < Y\max \times \sum_{i=1}^{k}\left(\frac{1}{Nif} - \frac{1}{Nir}\right)/sRi < 0.07. \tag{2-1}$$

14. The imaging lens according to claim 1, wherein Conditional Expression (3-1) is satisfied, which is represented by $$-0.2 < (Rb2r + Rb3f)/(Rb2r - Rb3f) < 0.1 \tag{3-1}$$

15. An imaging apparatus comprising the imaging lens according to claim 1.

16. An imaging lens consisting of, in order from an object side:
a first lens group that moves toward the object side during focusing from a distant object to a close-range object and has a positive refractive power; and
a second lens group that remains stationary with respect to an image plane during focusing,
wherein the first lens group has a first-B sub-lens group including an aperture stop in an inside thereof,
wherein the first-B sub-lens group consists of, in order from the object side, a b1 lens which is a positive lens, a b2 lens which is a negative lens concave toward an image side, an aperture stop, a b3 lens which is a negative lens concave toward the object side, and a b4 lens which is a positive lens,
wherein the second lens group consists of, in order from the object side, a negative lens, a positive lens, and a negative lens, and
wherein assuming that
a distance on an optical axis from an object side surface of the b1 lens to an image side surface of the b2 lens is Db12,
a distance on the optical axis from a surface closest to the object side in the first lens group to a surface closest to the image side in the first lens group is DG1,
a maximum image height is Ymax,
a total number of lens surfaces of the second lens group is k,
a refractive index of a medium, which forms an i-th lens surface from the object side in the second lens group, on the object side at a d line is Nif,
a refractive index of the medium, which forms the i-th lens surface from the object side in the second lens group, on the image side at the d line is Nir,
a radius of curvature of the i-th lens surface from the object side in the second lens group is sRi,
a radius of curvature of an object side surface of the b3 lens is Rb3f, and
a radius of curvature of an image side surface of the b3 lens is Rb3r,
Conditional Expressions (1), (2) and (6) are satisfied, which are represented by $$0.1 < Db12/DG1 < 0.25, \text{ and} \tag{1}$$

$$-0.02 < Y\max \times \sum_{i=1}^{k}\left(\frac{1}{Nif} - \frac{1}{Nir}\right)/sRi < 0.08, \text{ and} \tag{2}$$

$$-0.8 < (Rb3f + Rb3r)/(Rb3f - Rb3r) < 0. \tag{6}$$

17. The imaging lens according to claim 16, wherein Conditional Expression (6-1) is satisfied, which is represented by $$-0.75 < (Rb3f + Rb3r)/(Rb3f - Rb3r) < -0.05 \tag{6-1}$$

18. An imaging apparatus comprising the imaging lens according to claim 16.

19. An imaging lens consisting of, in order from an object side:
a first lens group that moves toward the object side during focusing from a distant object to a close-range object and has a positive refractive power; and
a second lens group that remains stationary with respect to an image plane during focusing,
wherein the first lens group has a first-B sub-lens group including an aperture stop in an inside thereof,
wherein the first-B sub-lens group consists of, in order from the object side, a b1 lens which is a positive lens, a b2 lens which is a negative lens concave toward an image side, an aperture stop, a b3 lens which is a negative lens concave toward the object side, and a b4 lens which is a positive lens,
wherein the second lens group consists of, in order from the object side, a negative lens, a positive lens, and a negative lens, and
wherein assuming that
a distance on an optical axis from an object side surface of the b1 lens to an image side surface of the b2 lens is Db12,
a distance on the optical axis from a surface closest to the object side in the first lens group to a surface closest to the image side in the first lens group is DG1,
a maximum image height is Ymax,
a total number of lens surfaces of the second lens group is k,
a refractive index of a medium, which forms an i-th lens surface from the object side in the second lens group, on the object side at a d line is Nif,
a refractive index of the medium, which forms the i-th lens surface from the object side in the second lens group, on the image side at the d line is Nir,
a radius of curvature of the i-th lens surface from the object side in the second lens group is sRi,
a radius of curvature of an object side surface of the b2 lens is Rb2f, and
a radius of curvature of the image side surface of the b2 lens is Rb2r,
Conditional Expressions (1), (2) and (7) are satisfied, which are represented by $$0.1 < Db12/DG1 < 0.25, \text{ and} \qquad (1)$$

$$-0.02 < Y\max \times \sum_{i=1}^{k} \left( \frac{1}{Nif} - \frac{1}{Nir} \right) \Big/ sRi < 0.08, \text{ and} \qquad (2)$$

$$0.3 < (Rb2f + Rb2r)/(Rb2f - Rb2r) < 1.5. \qquad (7)$$

20. The imaging lens according to claim 19, wherein Conditional Expression (7-1) is satisfied, which is represented by $$0.35 < (Rb2f+Rb2r)/(Rb2f-Rb2r) < 1.2 \qquad (7\text{-}1).$$

* * * * *